United States Patent
Hohteri et al.

(10) Patent No.: US 10,664,691 B2
(45) Date of Patent: May 26, 2020

(54) METHOD AND SYSTEM FOR AUTOMATIC IDENTIFICATION OF PLAYER

(71) Applicant: Sstatzz Oy, Helsinki (FI)

(72) Inventors: Harri Hohteri, Helsinki (FI); Tuukka Nieminen, Espoo (FI); Jirka Poropudas, Helsinki (FI)

(73) Assignee: SSTATZZ OY, Helsinki (FI)

( * ) Notice: Subject to any disclaimer, the term of this patent is extended or adjusted under 35 U.S.C. 154(b) by 36 days.

(21) Appl. No.: 16/163,655

(22) Filed: Oct. 18, 2018

(65) Prior Publication Data
US 2019/0050635 A1 Feb. 14, 2019

Related U.S. Application Data

(63) Continuation of application No. 14/715,456, filed on May 18, 2015, now Pat. No. 10,108,854.

(51) Int. Cl.
*G06K 9/00* (2006.01)

(52) U.S. Cl.
CPC ..... *G06K 9/00342* (2013.01); *G06K 9/00624* (2013.01)

(58) Field of Classification Search
None
See application file for complete search history.

(56) References Cited

U.S. PATENT DOCUMENTS

2015/0202517 A1* 7/2015 Jacobson ............ A61B 5/1123
700/92

* cited by examiner

*Primary Examiner* — James S. McClellan
*Assistant Examiner* — Peter J Iannuzzi
(74) *Attorney, Agent, or Firm* — Ziegler IP Law Group LLC

(57) ABSTRACT

Disclosed are method and system for automatic identification of at least one player. The system and method are associated with a processing unit, and at least one projectile having a wireless interface and at least one sensor. The sensor collects sensor data at a first moment of time before release of the projectile by the player and communicates the sensor data to the processing unit. The processing unit collects and analyses the sensor data to identify similar data, associates such data to a player, and stores the associated data. The sensor collects further sensor data at a second moment of time before release of the projectile by the player, which second moment of time is later than the first moment of time and communicates the further sensor data to the processing unit. The processing unit compares the further sensor data to the stored associated data to identify the player.

1 Claim, 6 Drawing Sheets

Training: Confusion Matrix

|   | 1 | 2 | 3 | 4 | 5 | |
|---|---|---|---|---|---|---|
| 1 | 117 / 16.3% | 0 / 0.0% | 0 / 0.0% | 0 / 0.0% | 0 / 0.0% | 100% / 0.0% |
| 2 | 0 / 0.0% | 106 / 14.8% | 0 / 0.0% | 0 / 0.0% | 0 / 0.0% | 100% / 0.0% |
| 3 | 0 / 0.0% | 0 / 0.0% | 173 / 24.1% | 0 / 0.0% | 0 / 0.0% | 100% / 0.0% |
| 4 | 0 / 0.0% | 0 / 0.0% | 0 / 0.0% | 124 / 17.3% | 0 / 0.0% | 100% / 0.0% |
| 5 | 0 / 0.0% | 0 / 0.0% | 0 / 0.0% | 0 / 0.0% | 197 / 27.5% | 100% / 0.0% |
|   | 100% / 0.0% | 100% / 0.0% | 100% / 0.0% | 100% / 0.0% | 100% / 0.0% | 100% / 0.0% |

← 302

Output Class (y-axis), Target Class (x-axis)

FIG. 3A

Validation: Confusion Matrix

|   | 1 | 2 | 3 | 4 | 5 | |
|---|---|---|---|---|---|---|
| 1 | 23 / 16.1% | 0 / 0.0% | 0 / 0.0% | 0 / 0.0% | 0 / 0.0% | 100% / 0.0% |
| 2 | 0 / 0.0% | 21 / 14.7% | 0 / 0.0% | 0 / 0.0% | 0 / 0.0% | 100% / 0.0% |
| 3 | 0 / 0.0% | 0 / 0.0% | 35 / 24.5% | 0 / 0.0% | 0 / 0.0% | 100% / 0.0% |
| 4 | 0 / 0.0% | 0 / 0.0% | 0 / 0.0% | 25 / 17.5% | 0 / 0.0% | 100% / 0.0% |
| 5 | 0 / 0.0% | 0 / 0.0% | 0 / 0.0% | 0 / 0.0% | 39 / 27.3% | 100% / 0.0% |
|   | 100% / 0.0% | 100% / 0.0% | 100% / 0.0% | 100% / 0.0% | 100% / 0.0% | 100% / 0.0% |

← 304

Output Class (y-axis), Target Class (x-axis)

FIG. 3B

METHOD AND SYSTEM FOR AUTOMATIC IDENTIFICATION OF PLAYER

TECHNICAL FIELD

The present disclosure relates generally to sports having a projectile; and more specifically, to a method and a system for automatic identification of players involved in such sports.

BACKGROUND

Performance of a player involved in a sport having a projectile, such as basketball, handball, rugby and the like, considerably depends on how well the player can handle the projectile. For example, in a game of basketball, the number of baskets scored by a player is the most crucial parameter to judge the player's performance. Therefore, a shooting technique (i.e. style of releasing the projectile) of a player plays an important factor in deciding the player's performance. Typically, there are systems or setups to monitor and analyse player's performance (such as the shooting technique) using various kinds of sensors either mounted on the projectiles or on the players.

Generally, the measured sensor data may be classified (segregated by correlation) into different patterns or forms to identify players associated therewith, and the different shooting techniques of the players. Further, such classified sensor data are of utmost interest for the training sessions of the players. For example, different training statistics, such as the number of shots taken by a specific player and shooting percentage (baskets scored) during a training session are of great interest for the players, the coaches and/or other team officers. One way to classify sensor data would be to assignee a specific ball (having sensors arranged thereon) to a specific player, however it becomes very cumbersome to manage such process, because such balls and players tend to mix during the training session, and therefore to implement such process a substantial manual effort is required.

Moreover, typically, a shooting technique adopted by an individual player depends firstly on physical aspects of the player, such as lengths of players upper arm and forearm, and secondly on his/her tendency to rhythm (make consistent) the shooting technique. Both aspects naturally cause gathered sensor data to appear different, since each sensor at least indirectly measures state of motion of the ball and sensor data changes with respect to time. For example, the sensor data may change as a function of time for at least young players that are in the process of standardizing or attaining rhythm for their shooting techniques.

Therefore, in light of the foregoing discussion, there exists a need to overcome the aforementioned drawbacks of identifying players, based on sensor data, involved in a sport having a projectile.

SUMMARY

The present disclosure seeks to provide a method for automatic identification of at least one player involved in a sport having a projectile.

The present disclosure also seeks to provide a system for automatic identification of at least one player involved in a sport having a projectile.

In one aspect, an embodiment of the present disclosure provides a method for automatic identification of at least one player, using a system comprising a processing unit, and at least one projectile separate from the processing unit and comprising a wireless interface and at least one sensor selected from the group consisting of an accelerometer, an angular rate sensor, a magnetometer and a pressure sensor, wherein the sensor collects sensor data at a first moment of time before release of the projectile by the player, the sensor communicates the sensor data to the processing unit, the processing unit collects and analyses the sensor data to identify similar data, associates such data to a player, and stores the associated data, the sensor collects further sensor data at a second moment of time before release of the projectile by the player, which second moment of time is later than the first moment of time, the sensor communicates the further sensor data to the processing unit, and the processing unit compares the further sensor data to the stored associated data to identify the player, and forms and stores further associated data.

In another aspect, an embodiment of the present disclosure provides a system for automatic identification of at least one player, comprising a processing unit at least one projectile separate from the processing unit and comprising at least one sensor selected from the group consisting of an accelerometer, an angular rate sensor, a magnetometer and a pressure sensor, and configured to collect sensor data, and a wireless interface configured to communicate the sensor data to the processing unit, wherein the processing unit is configured to collect and analyse the sensor data to identify similar data and to associate such data to a player, store the associated data, and use the associated data to identify the player at a later moment of time.

Embodiments of the present disclosure substantially eliminate or at least partially address the aforementioned problems in the prior art, and provide a method and a system for automatic identification of a player, based on sensor data only, involved in a sport having a projectile.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein:

FIGS. 3A-3D are confusion matrices representing performance of a classification algorithm for identifying similar sensor data, in accordance with various embodiments of the present disclosure.

Figure 1:
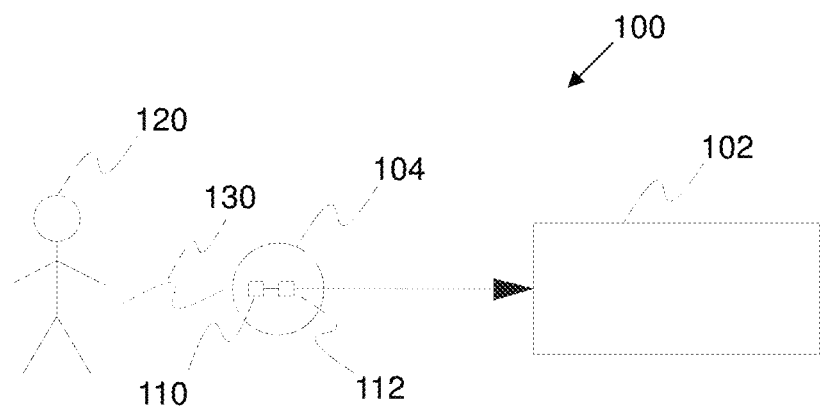
FIG. 1 is schematic illustration of a system for automatic identification of a player, in accordance with various embodiments of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In one aspect, an embodiment of the present disclosure provides a method for automatic identification of at least one player, using a system comprising a processing unit and at least one projectile separate from the processing unit and comprising a wireless interface. The at least one sensor selected from the group consisting of an accelerometer, an angular rate sensor, a magnetometer and a pressure sensor. The method comprises collecting sensor data from the sensor at a first moment of time before release of the projectile by the player; communicating the sensor data to the processing unit; collecting and analysing the sensor data by the processing unit to identify similar data, associating such data to a player, and storing the associated data; collecting further sensor data by the sensor at a second moment of time before release of the projectile by the player, which second moment of time is later than the first moment of time; communicating the further sensor data to the processing unit; and comparing the further sensor data by the processing unit to the stored associated data to identify the player, and forming and storing further associated data.

In another aspect, an embodiment of the present disclosure provides a system for automatic identification of at least one player. The system comprises a processing unit and at least one projectile separate from the processing unit. The at least one projectile comprises at least one sensor selected from the group consisting of an accelerometer, an angular rate sensor, a magnetometer and a pressure sensor, and configured to collect sensor data, and a wireless interface configured to communicate the sensor data to the processing unit. The processing unit is configured to collect and analyse the sensor data to identify similar data and to associate such data to a player; store the associated data; and use the associated data to identify the player at a later moment of time.

As mentioned herein, the system includes at least one projectile. Specifically, the projectile is associated with a spots, which includes but not limited to basketball, football, baseball, bowling, lacrosse, handball, soccer, javelin, shot put, hammer throw, tennis, ice hockey and the like. Further, a player involved in such sports either throws, shoots, kicks, strike or provides the projectile a ballistic trajectory (such that the projectile slides, rotates or flies). Preferably, the system includes a number of projectiles, such as two, three, four, five, six, seven, eight, nine, ten or more projectiles.

In an embodiment, the projectile is mounted with at least one sensor. For example, the sensor may be arranged on a surface or within the projectile. The at least one sensor is functionally responsible for measuring at least one of velocity, orientation and gravitational forces on the projectile, when a player is handling the projectile.

As mentioned above, the at least one sensor is selected from the group consisting of an accelerometer, an angular rate sensor, a magnetometer and a pressure sensor. Therefore, the accelerometer measures proper acceleration (i.e. total specific g-force) that the projectile is subjected to when a player in handling the projectile. In an embodiment, the accelerometer is selected from a group consisting of a one-axis accelerometer, a two-axis accelerometer and a three-axis accelerometer.

Further, the angular rate sensor, such as gyroscope, measure change in angular position (or orientation) of the projectile based on the angular momentum subjected to the projectile. In an embodiment, the angular rate sensor is selected from a group consisting of a one-axis angular rate sensor, a two-axis angular rate sensor and a three-axis angular rate sensor. Moreover, the magnetometer measures the magnetic fields the projectile is subjected to. In an embodiment, the magnetometer is selected from a group consisting of a one-axis magnetometer, a two-axis magnetometer and a three-axis magnetometer.

It may be evident that, the system of the present disclosure may utilize at least one sensor, such as a three-axis accelerometer (for example ±16 g accelerometer) or any combination of sensors (such as the accelerometer, the angular rate sensor, the magnetometer and the pressure sensor) to measure descriptive statistics (i.e. total specific g-force, orientation and the like) for the projectile (based on the sensors arranged thereon).

The projectile, particularly the sensors thereof, is communicably coupled to the processing unit. Specifically, the wireless interface of the projectile is configured to communicate the sensor data to the processing unit. The wireless interface may include but not limited to Bluetooth, WiFi, and the like.

In an embodiment, the processing unit is a computing device having electronic components which includes but not limited to a data memory, a processor, a wireless interface and a bus that operatively couples the data memory, the processor and the wireless interface. In the present embodiment, the processing unit also includes at least one algorithm, configured to be executable on the processor for processing the sensor data (received from the sensors).

In the present embodiment, the processing unit is configured to collect and analyse the sensor data to identify similar data and to associate such similar data to a player; thereafter store the associated data, and finally use the associated data to identify the player at a later moment of time.

Initially, the sensor collects sensor data at a first moment of time before release of the projectile by the player. Thereafter, the sensor communicates the sensor data to the processing unit, for example using the wireless interface of the projectile. Further, the processing unit collects and analyses the sensor data to identify similar data, associates such similar data to a player, and stores the associated data.

In an embodiment, the sensor data associated with the first moment of time primarily relates to collection of sample data for the at least one player. Specifically, sufficient sensor data is collected such that the system or a classification algorithm thereof may be trained. Further, the similar data can be associated with the at least one player handling the projectile, such as throwing, shooting, kicking, striking or provides a ballistic trajectory to the projectile. For example, if a player is handling a projectile, such as a basketball, the player may be asked to take numerous shots such that sufficient sensor data can be collected, which can constitute sample data for training the system or the classification algorithm thereof with respect to the player.

In an embodiment, the similar sensor data (i.e. the sample data for training the system or the classification algorithm) with respect to the player represents a digital fingerprint corresponding to that player. The digital fingerprint may be represented with descriptive statistics associated with the number and type of sensors used. Specifically, the digital fingerprint may be represented with the sensor data corresponding to at least one accelerometer, an angular rate sensor, a magnetometer and a pressure sensor or any combination thereof. Further, the digital fingerprint may be a graph of the descriptive statistics corresponding to at least one sensor.

In an embodiment, the descriptive statistics (for a sensor) includes raw sensor data, filtered sensor data, or transformed sample data (collected from the raw sensor data with the application of Fourier transform, wavelet transform or data interpolation).

In an embodiment, the digital fingerprint may be interpolated using seven nodes with an over-determined spline-type smooth interpolant to diminish the effect of measurement noise and used sample rate. Additionally, a mean square error over all six bins can be determined to indicate a goodness-of-fit to the sensor data (such as the total specific g-force).

In an embodiment, as mentioned herein above, the similar sensor data is identified with the help of the classification algorithm. For example, the classification algorithm is stored in the memory of the processing unit and is executed in the processor of the processing unit to identify similar sensor data (for the collected sensor data). In an example, identification of the similar sensor data is then done based the descriptive statistics and standard statistical classifiers including but not limited to distance metrics, logistic regression, support vector machines, linear discriminant analysis, and neural networks.

As mentioned herein, the sensor collects sensor data at a first moment of time before release of the projectile by the player. In one embodiment, the first moment of time before release of the projectile is a very small time period for which sensor data is considered. For example, the first moment of time before release of the projectile can be one second, couple of seconds or a fraction of second.

Once the similar sensor data (related to a player) is identified and associated to a player, the associated data is stored in the memory of the processing unit for identifying the player at a later moment of time. For example, the sensor collects further sensor data at a second moment of time before release of the projectile by the player; the second moment of time being later than the first moment of time. Thereafter, the sensor communicates the further sensor data to the processing unit. The processing unit compares the further sensor data to the stored associated data to identify the player, and forms and stores further associated data. For example, when similar sensor data is identified and associated with a player, in such instance the further collected sensor data is compared to the stored associated data to identify the player. For example, when the further collected sensor data is identified similar to the stored associated data, the player associated with (or corresponding to) the stored associated data can be simply identified based on the similarity between the further collected sensor data and the stored associated data.

In one embodiment, the system may be configured to further consider sensor data (of the projectile) after the release of projectile. For example, the sensor collects data at a third moment of time after release of the projectile by the player and at a fourth moment of time after release of the projectile by the player. The third moment is after the first moment and before the second moment, and the fourth moment is after the third moment.

In an embodiment, the processing unit collects and analyses the sensor data (for the third moment of time) to identify similar data, associates such similar data to a player, and stores the associated data. Thereafter, the processing unit compares a further sensor data (for the fourth moment of time) to the stored associated data to identify the player. Specifically, the processing unit collects and analyses the sensor data after the release of projectile for identifying the player.

In an embodiment, the sensor data collected after release of the projectile (i.e. for the third moment of time and fourth moment of time) may be correlated with the sensor data collected before release of the projectile (i.e. for the first moment of time and the second moment of time). For example, the sensor data (for the first moment of time and second moment of time) is correlated with data for the third moment of time and fourth moment of time, respectively, for a player. This enables in validating the identification of the player done based on the identification of similar sensor data for both before and after release of the projectile.

In an embodiment, the identification of similar sensor data and association of such similar data with a player may be done with the help of a neural network. Further, performance of such neural network may be determined with help of confusion matrices. For example, correctness (or efficiency) of the results obtained using the neural network is determined using the confusion matrices.

In an embodiment, the system may also include a mobile communication terminal on which a user interface is rendered by the processing unit. Specifically, a wireless interface of the processing unit may be configured to establish a wireless communication between the processing unit and the mobile communication terminal for rendering the user interface thereon.

In an embodiment, the processing unit displays the further associated data in the user interface. Further, the further associated data may include a list of players. Also, the further associated data may include digital fingerprints of the players. As mentioned herein the system initially collects sample data for the players, therefore the system registers such players and the list of players is generated therefrom.

In an embodiment, the associated data is used as a password to log onto a user account. The user account may contain various kinds of information associated with a player, i.e. a player's identification, player's performance, player's feedback and the like. Further, the user account may be associated with a player. Otherwise, the user account may be associated with a coach of the player. For example, the mobile communication terminal may be associated with the player or the coach of the player. Moreover, the mobile communication terminal may include but is not limited to a smart phone, tablet, laptop and the like.

In another embodiment, the mobile communication terminal may be configured to act as the processing unit of the system. For example, the mobile communication terminal may be configured to perform all the functions of the processing unit described herein above, such as to collect and analyse the sensor data to automatically identify a player.

The present disclosure provides a method and a system to automatically identify a player, a player's shooting technique or style, and a player's feedback using only the sampled data collected by at least one sensor arranged on the projectile. For example, the method and system of the present disclosure may enable in automatically identifying a basketball player among plurality of basketball players, shooting technique or style of the player (i.e. while taking free throw, jump shot, dunk, and the like), and feedback for the player to improve his/her shooting technique based only on the sampled data collected by at least one sensor.

In an embodiment, the method and the system may enable in identifying a player among different players based only on the sampled data collected by at least one sensor. For example, during a training session when a plurality of basketball players are practicing in a basketball court. In such instance, the players for whom the system or the classification algorithm is trained with the sample data can be automatically identified based on the similarity of further collected sensor data and stored trained data. Further, different training statistics, such as the number of shots taken by a specific player and his/her shooting percentage may be also derived from such data.

In another example, the system may be used by individuals such as friends (each having a smart phone, such as the mobile communication terminal explained herein above) when training or playing with a basketball in a basketball court. In such instance, the individuals for whom the system or the classification algorithm is trained with the sample data can be automatically identified based on the similarity of further collected sensor data and stored trained data.

The above examples are related to a supervised network, in which the system or the classification algorithm is trained with sample data of players or individuals. However, when the system or the classification algorithm is not trained with sample data of players or individuals, then a similar classification algorithm may be used to automatically classify the participating players or individuals into different categories. In such instance, the neural network constituted is an unsupervised network.

In another embodiment, the method and system may enable in identifying a shooting style or technique of a player. For example, a player, having stored sample data (digital fingerprints or for whom the system or the classification algorithm is trained with the sample data), during training can automatically identify a shooting style (pattern) based the stored similar data. Further, if non-similar data is identified, based on consistency (substantial amount) of such non-similar data a new shooting style (pattern) can be identified. Moreover, a similarity between the shooting styles of a player and a famous player may be identified if the player is unknowingly shooting like the famous player. Otherwise, similarity or dissimilarity between the shooting styles of a player and a famous player may be identified when the player is knowingly shooting like the famous player.

In another embodiment, the method and system may enable in achieving or getting a player's feedback (i.e. how well a player is performing, learning or handling the projectile). For example, a player can create his or her target digital fingerprint by collecting a sample data (for example regarding a shooting technique of the player) and manually classifying them into "desirable" and "undesirable" shots, i.e. based on the player's own experience or advice of a shooting coach. Further, in case of a new shooting style, the new shots can be compared to the target fingerprint to analyse how well they match the target fingerprint, such that differences between observed new shots and the target fingerprint can be analysed in order to produce physical interpretations of the mistakes made.

In one embodiment, the observed differences (between the new shots and the target fingerprint) can be translated into verbal feedback of how to improve the new shot in order to match the target fingerprint more closely. Further, in case when a player wants to shoot like a famous player, the verbal instructions may be generated for imitating the given shooting technique.

DETAILED DESCRIPTION OF THE DRAWINGS

Referring to FIG. 1, illustrated is a system 100 for automatic identification of a player, in accordance with various embodiments of the present disclosure. Specifically, the system 100 is associated with automatic identification of at least one player involved in a sport using a projectile. As shown, the system 100 includes a processing unit 102 and a projectile 104 separate from the processing unit 102. The projectile 104 includes at least one sensor 110 (such as an accelerometer, an angular rate sensor, a magnetometer or a pressure sensor) configured to collect sensor data. The projectile 104 also includes a wireless interface 112 configured to communicate the sensor data to the processing unit 102.

The processing unit 102 is configured to collect and analyse the sensor data to identify similar data and to associate such data to a player 120. Thereafter, the processing unit 102 is configured to store the associated data, and use the associated data to identify the player 120 at a later moment of time. Specifically, the sensor data is considered for a moment of time 130 (for example a first moment of time and a later second moment of time of about 1 second) before release of the projectile by the player 120. The processing unit 102 collects and analyses the sensor data for the first moment of time to identify similar data (using a classification algorithm), associates such similar data to the player 120, and stores the associated data. Thereafter, the processing unit 120 compares further sensor data (associated with the second moment of time) to the stored associated data to identify the player, and forms and stores further associated data.

The system 100 also includes a mobile communication terminal (not shown) communicably coupled to the processing unit 102. The processing unit 102 renders a user interface on the mobile communication terminal. Specifically, the processing unit displays further associated data in the user interface. The further associated data includes a list of players. Moreover, the further associated data is used as a password to log onto a user account, associated with either a player or a coach of the player.

Referring now to FIGS. 2A-E, illustrated are digital fingerprints for five players, in accordance with various embodiments of the present disclosure. Specifically, the FIGS. 2A-E illustrate sensor data of a projectile, such as the projectile 104, representing different shooting technique or styles of the five players.

Figure 2A:
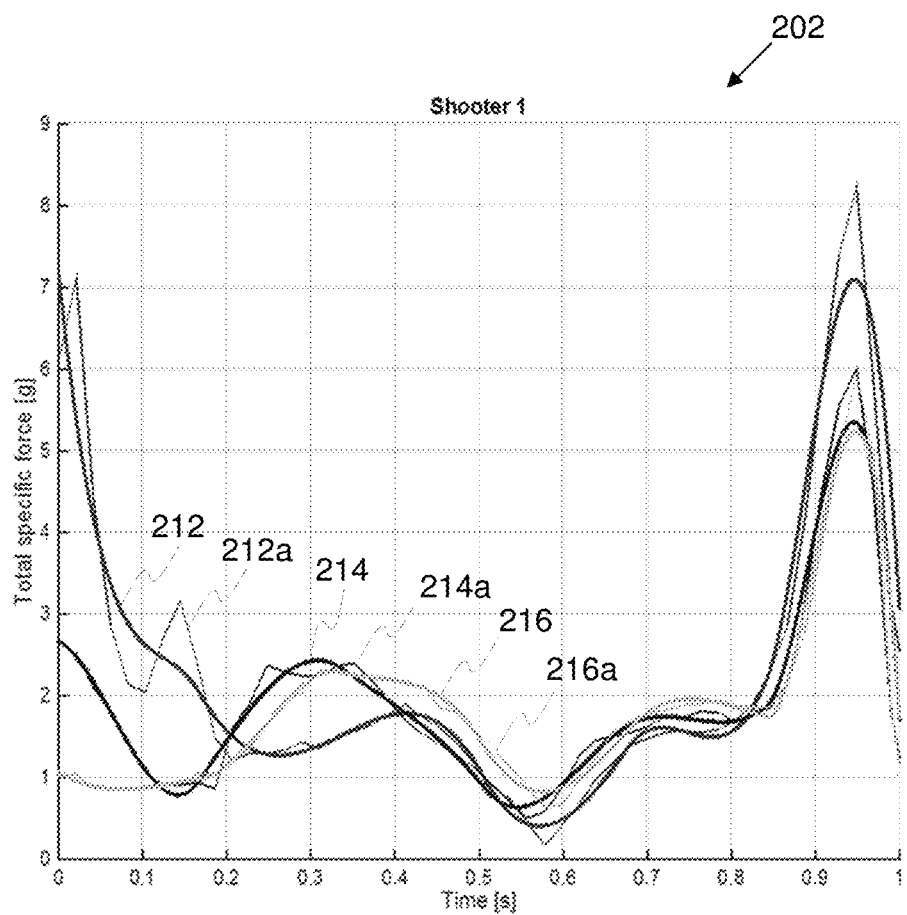
FIGS. 2A-2E are digital fingerprints of five players depicting their shooting technique or styles, in accordance with various embodiments of the present disclosure.
Figure 2B:
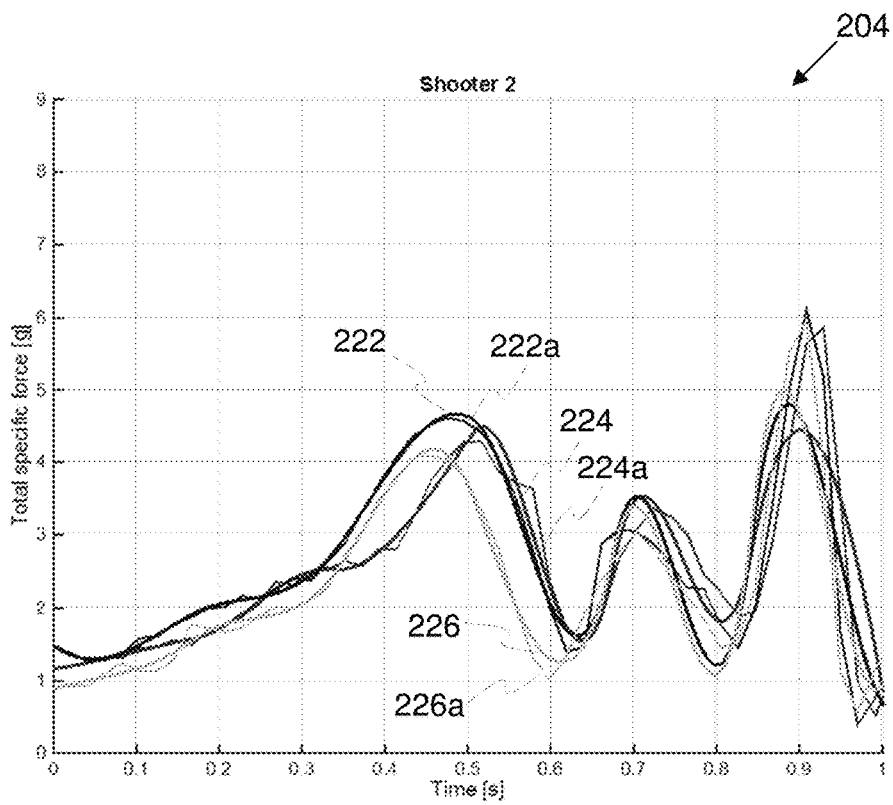

As shown, the FIG. 2A illustrates a digital fingerprint 202 for a player, for example shooter 1, playing basketball. Further, the digital fingerprint 202 is represented with a descriptive statistic (for example total specific g-force collected from an accelerometer) plotted against time. The digital fingerprint 202 includes identified similar data for the shooter 1 (i.e. the sensor data for the first time of period, which constitute a sample data for training the system 100 or the classification algorithm thereof). The identified similar data for the shooter 1 are shown with thick lines depicting three different shooting technique or styles 212, 214, 216 of the shooter 1. Each of the three different shooting techniques 212, 214, 216 is computed with at least 20 descriptive statistics (i.e. correlated total specific g-force of 20 shots). Further, the three different shooting techniques 212, 214, 216 are represented with measured total specific g-force for 1 second (i.e. the first moment of time prior to release of the projectile). The representation of the three different shooting techniques 212, 214, 216 is done with the help of interpolation, for example, using seven nodes with an over-determined spline-type smooth interpolant. Moreover, during sensor data collection of 1 second, the sensor includes a measuring frequency of 50 Hz (i.e. the sensor collects 50 measurements in one second).

The digital fingerprint 202 also includes compared further sensor data (associated with the second moment of time) shown with thin lines corresponding for the three different shots 212a, 214a, 216a of the shooter 1. As shown, the three different shots 212a, 214a, 216a are associated with (or correspond to) the three different shooting techniques 212, 214, 216 based on proximity or closeness of the sensor data. Further, as shown, the sensor data is more consistent between 0.3 and 1.0 seconds suggesting that 0.7 seconds (i.e. about 35 measurements out 50 measurements prior to release the projectile) is sufficient to correlate or associate the three different shots 212a, 214a, 216a with the three different shooting techniques 212, 214, 216, respectively.

Further, the sensor data corresponding to the three different shooting techniques 212, 214, 216 and shots 212a, 214a, 216a includes three local maxima (or peaks) at around 0.3, 0.7 and 0.9 seconds. In such instance, the six properly chosen descriptive statistics (i.e. total specific g-force value and corresponding time for the three local maxima) is sufficient to automatically distinguish the shooter 1 from other players or shooters (for example five players).

Referring now to FIGS. 2B-E, digital fingerprints 204, 206, 208 and 210 for the players, for example shooters 2-5 are shown, respectively. The digital fingerprints 204, 206, 208 and 210, similar to the digital fingerprints 202 of the shooter 1, include sensor data for three different shooting techniques. For example, the digital fingerprint 204 for the player or shooter 2 includes three different shooting techniques 222, 224, 226, and three shots 222a, 224a, 226a associated with (or corresponding to) the three different shooting techniques 222, 224, 226, respectively. Also, the digital fingerprint 204 includes three local maxima at around 0.5, 0.7 and 0.9 seconds of time.

Figure 2C:
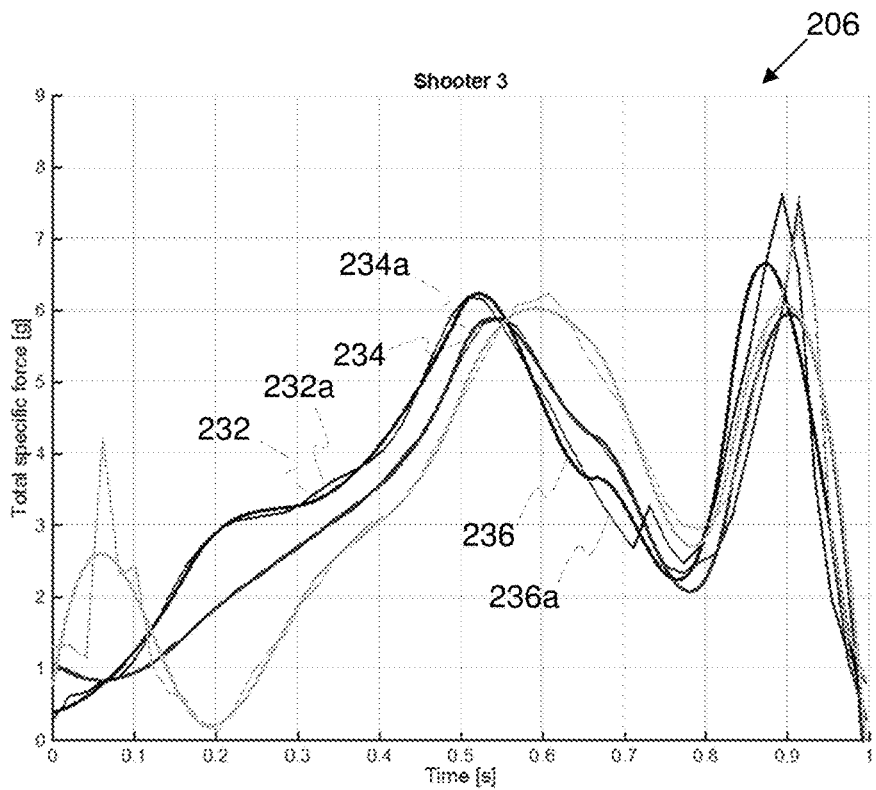
Figure 2D:
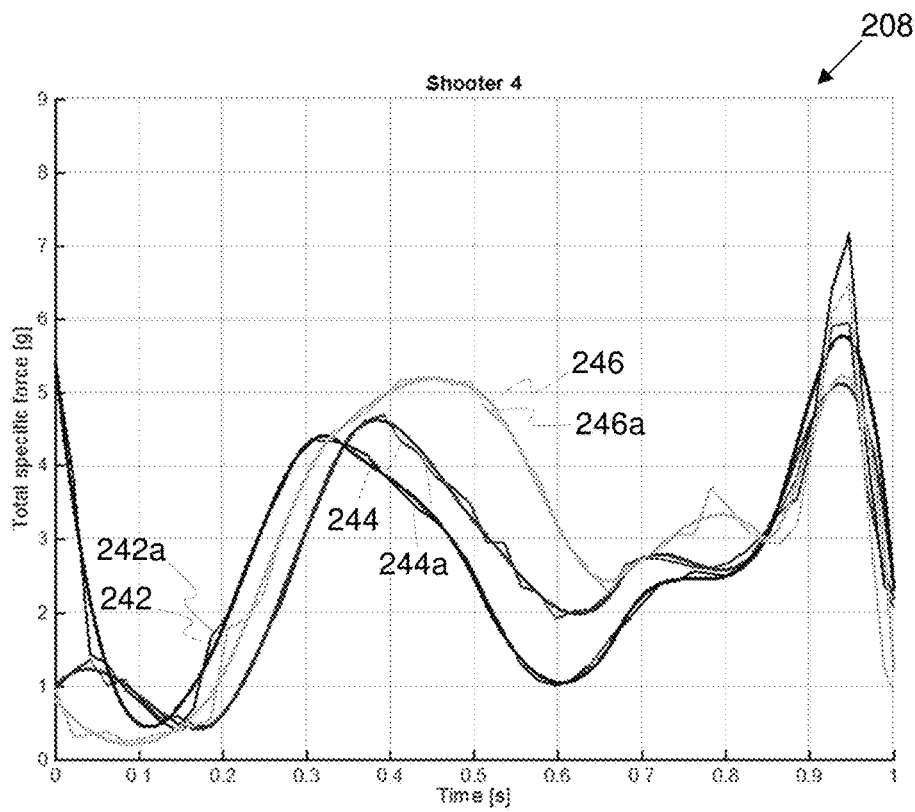
Figure 2E:
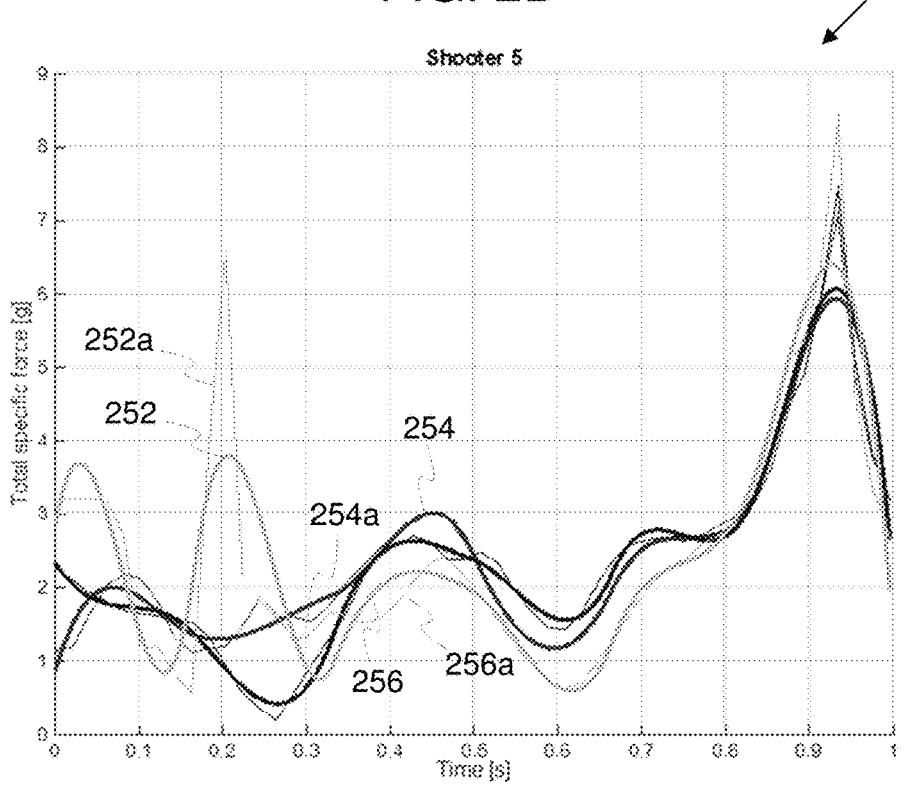

The FIG. 2C, similarly, depicts the digital fingerprint 206 for the player or shooter 3 including three different shooting techniques 232, 234, 236, and three shots 232a, 234a, 236a associated with (or corresponding to) the three different shooting techniques 232, 234, 236, respectively. Also, the digital fingerprint 206 also includes two local maxima at around 0.5 and 0.9 seconds of time. Further, the FIG. 2D depicts the digital fingerprint 208 for the player or shooter 4 including three different shooting techniques 242, 244, 246, and three shots 242a, 244a, 246a associated with (or corresponding to) the three different shooting techniques 242, 244, 246, respectively. Also, the digital fingerprint 208 includes three local maxima at around 0.4, 0.7 and 0.95 seconds of time. Moreover, the FIG. 2E depicts the digital fingerprint 210 for the player or shooter 5 including three different shooting techniques 252, 254, 256, and three shots 252a, 254a, 256a associated with (corresponding to) the three different shooting techniques 252, 254, 256, respectively. Also, the digital fingerprint 210 includes three local maxima at around 0.2, 0.45 and 0.95 seconds of time.

Therefore, based on the above digital fingerprints 202, 204, 206, 208, 210, the players or shooters 1-5 are automatically distinguishable from each other. For example, the six properly chosen descriptive statistics (i.e. total specific g-force value and corresponding time for the local maxima) can be taken into consideration for automatically distinguishing the shooters 1-5 from each other.

Referring now to FIGS. 3A-3D, illustrated are different confusion matrices 302-308 representing performance of a classification algorithm for identifying similar sensor data, in accordance with an embodiment of the present disclosure. Specifically, the confusion matrices 302-308 of FIGS. 3A-D represent the performance of the neural network (classification algorithm), in which columns of the confusion matrices 302-308 represent target classes (or predicted classes) and rows represent output classes (or actual classes). Further, the neural network includes two hidden layers, and includes a following structure [20]->[15]->[7]->[5]->[5], in which the first figure, i.e. [20] represents the number of descriptive statistics (for example total specific g-force value corresponding to 20 shots), subsequent two figures i.e. [15] and [7] represent number (or size) of output classes, and the last two figures i.e. [5] and [5] represent number of target classes.

The confusion matrices 302-308 of FIGS. 3A-3D also depict results obtained using the neural network; showing the performance separately for each data sample classes and an overall performance. For example, FIGS. 3A-3C relate to three data sample classes, i.e. a first data sample class (constituted by a predetermined percentage of an overall data set) for training the system 100 (or the classification algorithm thereof), a second data sample class for validating a neural network used for classification of the sensor data, and a third data sample class for testing or cross-validation, respectively. Further, FIG. 3D relates to an overall performance of the system 100 (or the classification algorithm thereof) based on the combination of the three data sample classes.

Figure 3C:
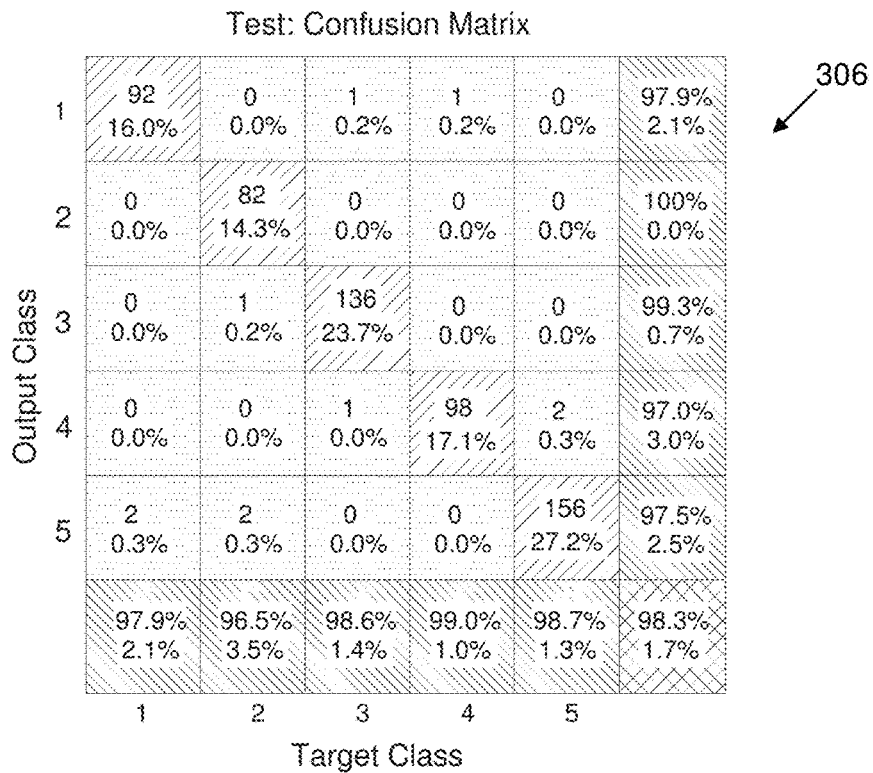
Figure 3D:
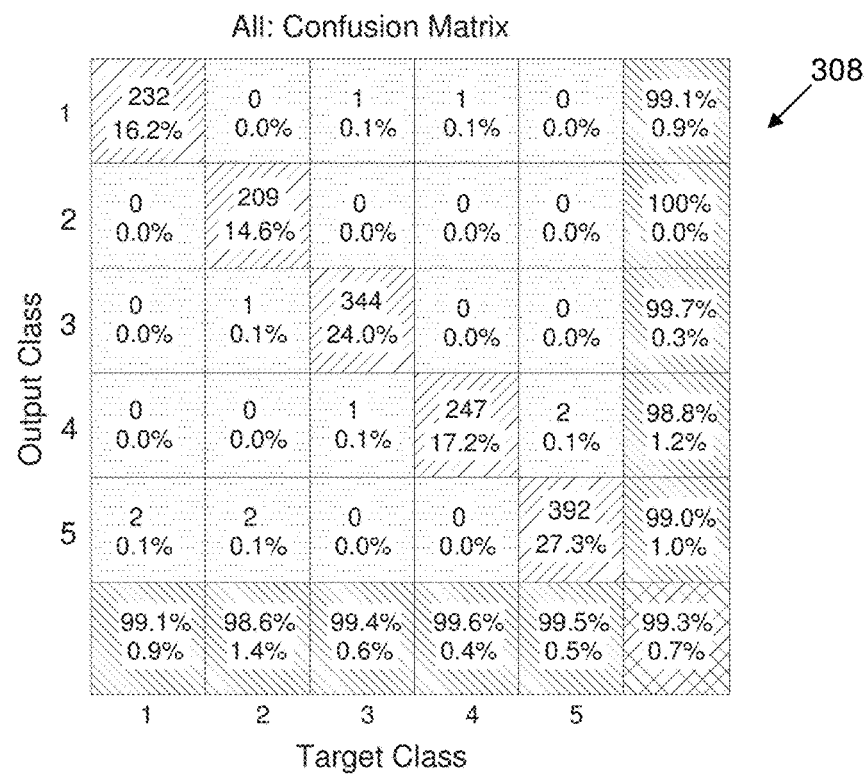

As shown in FIG. 3D, an overall data set contains around 1500 shots (more specifically the overall data set contains 1424 shots, i.e. summation of the diagonal boxes (232+209+344+247+392=1424) of the confusion matrix 308. Further, the number of 1424 shots (or the overall data set) is divided among the five shooters, for example shooter 1 through shooter 5. For example, the shooters 1 through 5 take 232, 209, 344, 247 and 392 shots, respectively.

As mentioned herein the overall data set (1424 shots) is divided into three data sample classes, particularly, about 50% of the overall data set is utilized for training the system 100 or the classification algorithm thereof. Specifically, as shown in FIG. 3A, the diagonal boxes of the confusion matrix 302 includes about 50% of the overall data set (1424 shots), i.e. 117+106+173+124+197=717 shots. Further, about 10% of the overall data set is utilized to validate the neural network used for identifying similar sensor data. Specifically, as shown in FIG. 3B, the diagonal boxes of the confusion matrix 304 includes about 10% the overall data set (1424), i.e. 23+21+35+25+39=143 shots. Moreover, the remaining about 40% of the overall data set is taken for cross-validation. Specifically, as shown in FIG. 3C, the diagonal boxes of the confusion matrix 306 includes about 40% the overall data set (1424 shots), i.e. 92+82+136+98+156=564 shots. The confusion matrix 306 of FIG. 3C also represents an unbiased performance level of about 98.3% (i.e. only 10 misclassifications out of 564 samples) for the system 100 (or the classification algorithm thereof). However, the confusion matrix 308 of FIG. 3D represents an overall performance level of about 99.3% for the system 100 (or the classification algorithm thereof).

Figure 4:
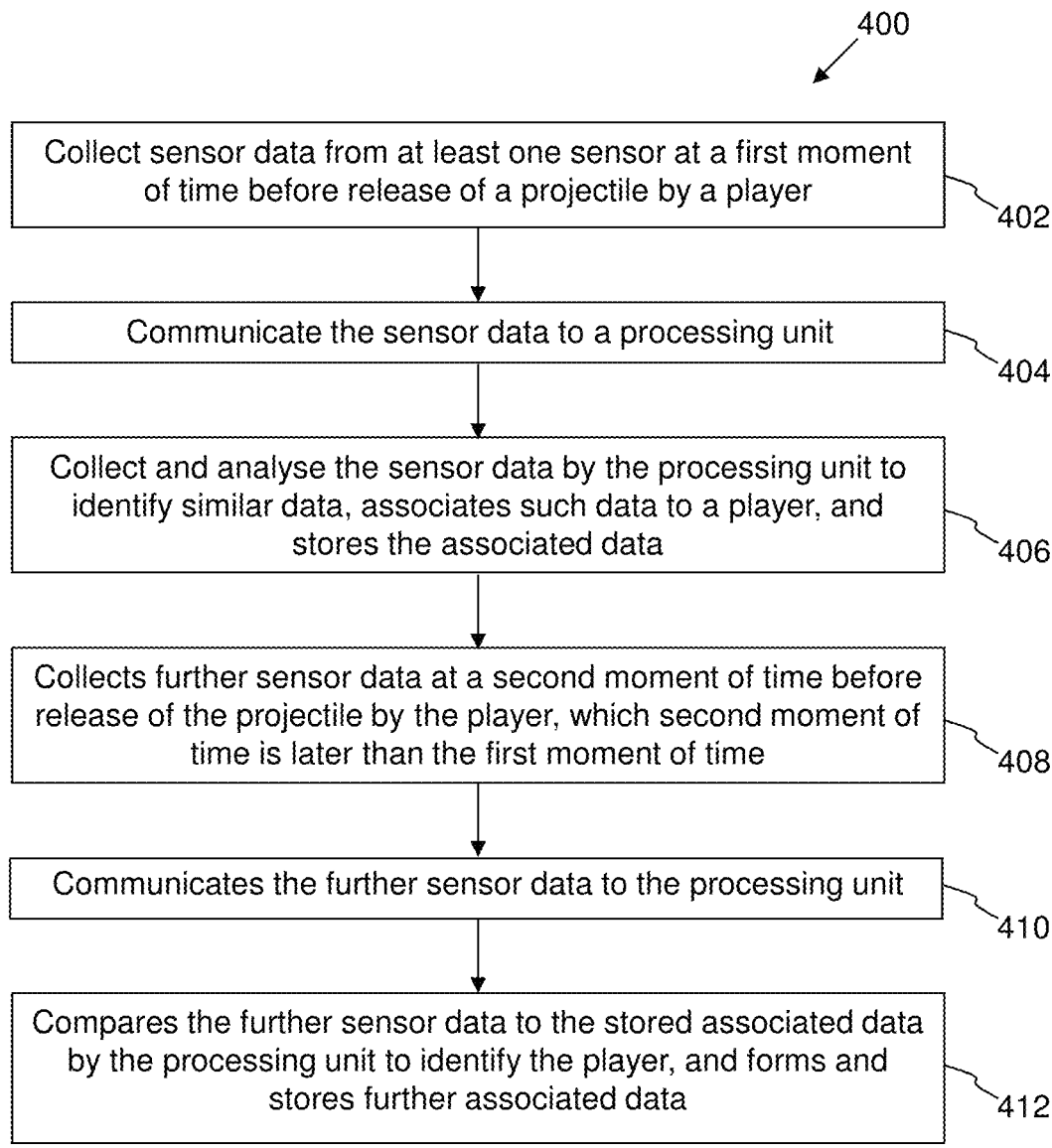
FIG. 4 is an illustration of steps of a method for automatic identification of at least one player, in accordance with an embodiment of the present disclosure.

Referring now to FIG. 4, illustrated are steps of a method 400 for automatic identification of at least one player, in accordance with an embodiment of the present disclosure. Specifically, the method 400 is associated with the system 100, for automatic identification of at least one player involved in a sport having a projectile, explained in conjunction with the FIGS. 1-3D.

At step 402, at least one sensor collects sensor data at a first moment of time before release of a projectile by a player. The at least one sensor is arranged on the projectile.

At step 404, the sensor communicates the sensor data to the processing unit. The processing unit is separate from the projectile, and communicably coupled to the projectile by a wireless interface.

At step 406, the processing unit collects and analyses the sensor data to identify similar data, associates such data to a player, and stores the associated data.

At step 408, the sensor collects further sensor data at a second moment of time before release of the projectile by the player, the second moment of time is later than the first moment of time.

At step 410, the sensor communicates the further sensor data to the processing unit.

At step 412, the processing unit compares the further sensor data to the stored associated data to identify the player, and forms and stores further associated data.

The steps 402 to 412 are only illustrative and other alternatives can also be provided where one or more steps are added, one or more steps are removed, or one or more steps are provided in a different sequence without departing from the scope of the claims herein. For example, the method 400 further includes collecting sensor data at a third moment of time after release of the projectile by the player and at a fourth moment of time after release of the projectile by the player, which third moment is after the first moment and before the second moment, and the fourth moment is after the second moment. The method 400 also includes displaying the further associated data by the processing unit in a user interface. The user interface is rendered on a mobile communication terminal. The further associated data comprises a list of players. Further, the associated data is used as a password to log onto a user account.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A method for automatic identification of at least one player, using a system comprising
    a processing unit, and
    at least one projectile separate from the processing unit and comprising a wireless interface and at least one sensor selected from the group consisting of an accelerometer, an angular rate sensor, a magnetometer and a pressure sensor,
wherein
    the sensor collects sensor data at a first moment of time before release of the projectile by the player,
    the sensor communicates the sensor data to the processing unit,
    the processing unit collects and analyses the sensor data to identify similar data, associates such data to a player, and stores the associated data,
    the sensor collects further sensor data at a second moment of time before release of the projectile by the player, which second moment of time is later than the first moment of time,
    the sensor communicates the further sensor data to the processing unit, and
    the processing unit compares the further sensor data to the stored associated data to identify the player, and forms and stores further associated data.

* * * * *